D. D. Wood.
Corn Planter.
N° 87,018. Patented Feb. 16, 1869.

Witnesses:
A. Bennemendorf
Wm. A. Morgan

Inventor:
D. D. Wood
per [signature]
Attorney

DANIEL D. WOOD, OF PARIS, ILLINOIS.

Letters Patent No. 87,018, dated February 16, 1869.

IMPROVEMENT IN CORN-PLANTER.

The Schedule referred to in these Letters Patent and making part of the same.

*To all whom it may concern:*

Be it known that I, DANIEL D. WOOD, of Paris, in the county of Edgar, and State of Illinois, have invented a new and improved Corn-Planter; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved corn-planter, simple in construction, convenient, reliable, and accurate in operation, and which may be manufactured at a comparatively small expense; and It consists in the construction and combination of the various parts of the machine, as hereinafter more fully described.

Figure 1:
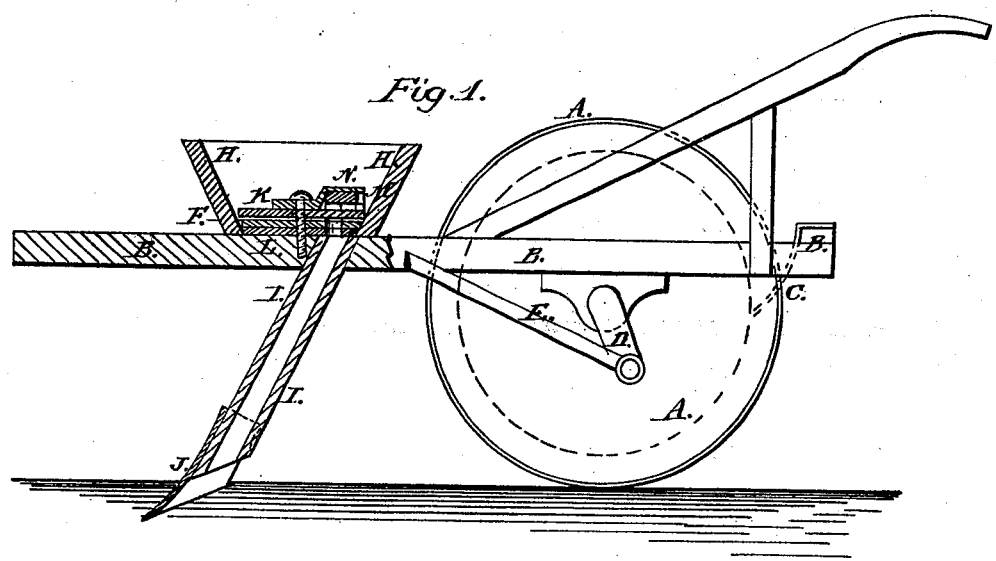
Figure 1 is a side view of my improved corn-planter, partly in section, through the line $x\ x$, fig. 2.

A is the drive and covering-wheel, the journals of which revolve in bearings, attached to the side bars of the frame B, as shown in fig. 1.

Figure 2:
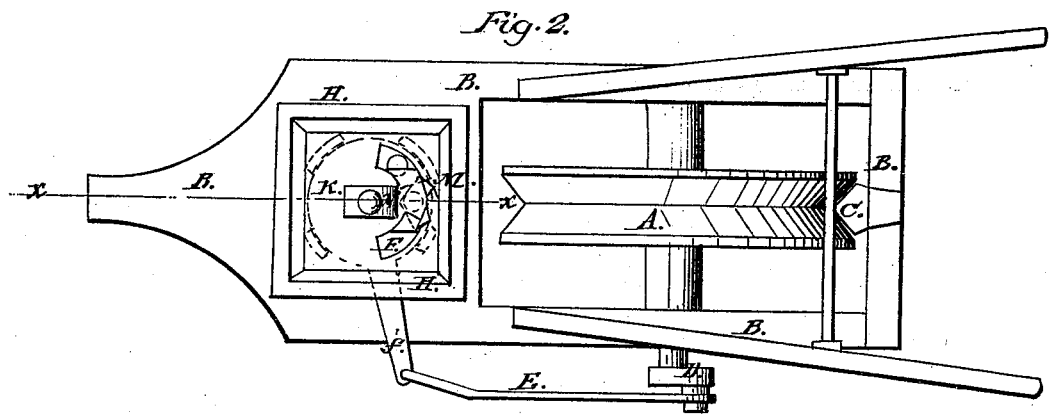
Figure 2 is a top or plan view of the same.

The wheel A is made broad, and its face is grooved, as shown in fig. 2, so that as the machine is drawn forward, the said grooved wheel A may press down the soil into the furrow, covering the seed.

C is a scraper, attached to the rear cross-bar of the frame B, and which is made in such a form as to correspond with the groove in the wheel A, to keep the said wheel free from the soil that might otherwise adhere to it, and clog up the groove in its face.

To the projecting end of one of the journals of the wheel A is attached, or upon it is formed, a crank, D, to the crank-pin of which is pivoted the rear end of the pitman E, the forward end of which is pivoted to the projecting end of the arm $f$, formed upon or attached to the central or dropping-plate F, so that the said plate may be operated to drop the corn by the movement of the wheel A.

H is the hopper or seed-box, which is securely attached to the forward part or platform of the frame B.

I is a hollow wooden stem, attached to the frame B, below the hopper H, to the lower end of which is attached the shovel-plow J, to open the furrow to receive the seed, and which stem, I, at the same time, serves as a conductor-spout, to conduct the seed from the dropping-device to the ground.

In the bottom of the hopper H are placed three plates, K F L, the upper and lower ones of which are stationary, and the central one of which is movable, being operated from the wheel A, by the crank D and pitman E.

The lower plate, L, has a hole formed through it, directly over the hole in the stem or standard I, to allow the seed to pass through the said plate to the said standard.

The upper plate, K, has two curved slots formed through it, as shown in fig. 2, to allow the seed in the seed-box H to pass freely to the central movable plate F.

The plate F has two holes formed in it, of sufficient capacity to contain enough corn to form a hill, which said holes alternately receive corn from the hopper H, through the slots of the plate K, and convey it to the hole in the plate L, through which it passes to the ground, through the hollow standard I.

M is a rubber, or equivalent block, placed upon the plate K, between the adjacent ends of the curved slots through said plate, and which should be of such a size as to overlap the ends of the said curved slots, so as to prevent the plate F from carrying out any more corn than sufficient to fill the holes in said plate F.

The rubber, or equivalent block M, is held in place by the arm N, or other suitable support.

Having thus described my invention,

I claim as new, and desire to secure by Letters Patent—

The combination of the grooved wheel A, crank D, pitman E, movable plate F, stationary plates K and L, hollow standard I, and shovel-plow J, with each other, and with the frame B and hopper H, said parts being constructed and arranged substantially as herein shown and described, and for the purpose set forth.

DANIEL D. WOOD.

Witnesses:
  JOHN B. WOOD,
  JAMES POOR.